United States Patent [19]

Dixon, Jr. et al.

[11] Patent Number: 5,080,393
[45] Date of Patent: Jan. 14, 1992

[54] METHOD AND APPARATUS FOR FORMING AN AIR BAG DEPLOYMENT OPENING

[75] Inventors: Alfred R. Dixon, Jr., Bloomfield Hills; David J. Bauer, West Bloomfield, both of Mich.

[73] Assignee: Tip Engineering Group, Inc., Farmington Hills, Mich.

[21] Appl. No.: 303,132

[22] Filed: Jan. 30, 1989

[51] Int. Cl.⁵ .............................................. B60R 21/16
[52] U.S. Cl. .................................. 280/732; 280/743; 89/1.14
[58] Field of Search ............... 280/731, 732, 734, 735, 280/728, 743, 752; 89/1.14, 1.11

[56] References Cited

U.S. PATENT DOCUMENTS

| | | | |
|---|---|---|---|
| 3,486,410 | 12/1969 | Drexelius et al. | 89/1.14 |
| 3,528,681 | 9/1970 | Ekstrom | 89/1.14 X |
| 3,632,136 | 1/1972 | Foltz | 280/732 |
| 3,640,546 | 2/1972 | Braun | 280/735 X |
| 3,698,281 | 10/1972 | Brandt et al. | 89/1.14 |
| 4,334,699 | 6/1982 | Patzelt et al. | 280/731 |
| 4,717,096 | 1/1988 | Labarre et al. | 89/1.14 X |
| 4,810,005 | 3/1989 | Fohl | 280/735 X |

FOREIGN PATENT DOCUMENTS

| | | | |
|---|---|---|---|
| 3315535 | 3/1984 | Fed. Rep. of Germany | 280/732 |
| 3545028 | 7/1987 | Fed. Rep. of Germany | 280/734 |

Primary Examiner—Kenneth R. Rice
Assistant Examiner—Tamara L. Finlay
Attorney, Agent, or Firm—John R. Benefiel

[57] ABSTRACT

A method and apparatus are disclosed for instantly forming an air bag deployment opening in an auto interior trim panel structure such as an instrument panel or steering wheel cover just prior to inflation of the air bag. A delineated pattern of concentrated energy is instantaneously applied to the inside of the trim structure as by ignition of a segment of detonating cord to fracture a section of the trim panel in a required door shape just before the air bag is inflated. The air bag, stored behind the trim panel, engages and pushes open the door so formed in the trim panel when activated, and is able to be deployed through the resulting opening. The trim panel may therefor be free from any exteriorly visible markings defining a deployment door until deployment actually occurs.

3 Claims, 2 Drawing Sheets

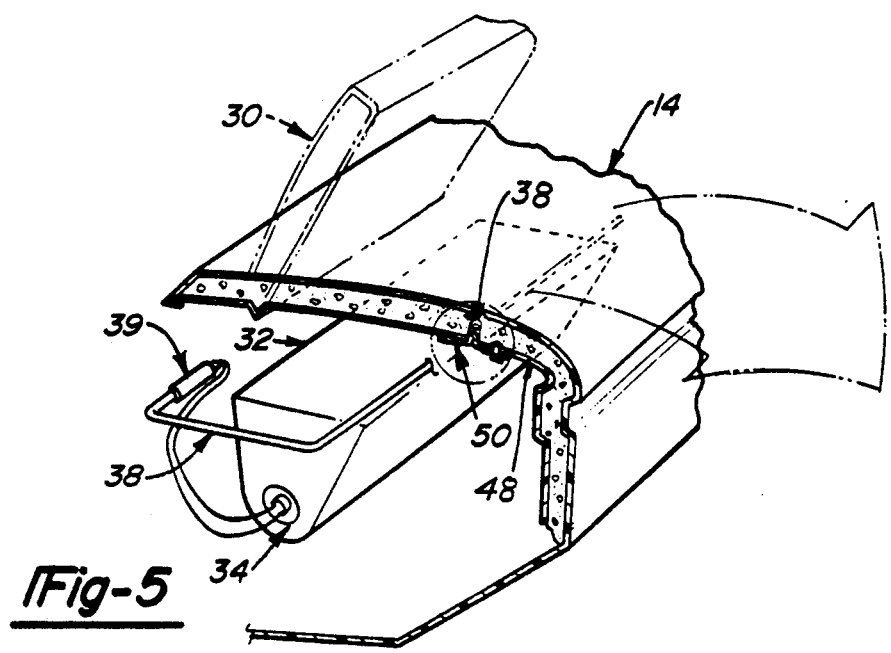
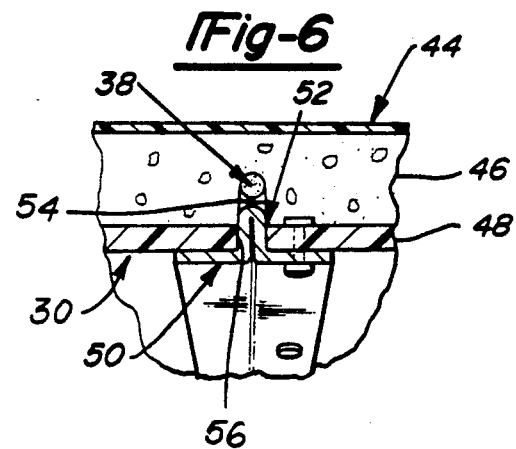
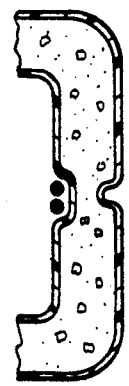

METHOD AND APPARATUS FOR FORMING AN AIR BAG DEPLOYMENT OPENING

BACKGROUND OF THE INVENTION

1. Field of the Invention

This invention concerns air bag safety devices for auto vehicles which have been devised to be deployed during a severe collision to cushion the driver and/or passengers to prevent or reduce the severity of injuries.

2. Description of the Prior Art

In air bag installations, an air bag "cannister", comprised of a receptacle holding a folded air bag and an inflation apparatus, is stored behind a section of an auto interior trim panel, such as the instrument panel (passenger side bag) or steering wheel cover (driver side bag). The air bag is inflated to be deployed within the passenger compartment as the collision occurs, and thus must enter the passenger compartment through an opening in the trim panel. Typically, a pair of doors are installed in a vertical rear facing surface of the instrument panel (mid mount) or steering wheel cover, or a single door is provided in an upper surface of the instrument panel (top mount). The doors are designed to be opened by the air bag as it inflates during deployment.

A drawback to the prior designs is that the doors are exteriorly visible, i.e., are apparent to the driver or passenger seated in the passenger compartment, which visibility creates a mild state of apprehension in some persons.

Also, the separate door construction adds to the cost of the interior trim, and may adversely affect the aesthetics of the interior finishing.

Examples of such deployment door designs are described in copending applications Ser. No. 241,893 filed on Sept. 8, 1988 now U.S. Pat. No. 4,893,833 and Ser. No. 258,890 filed on Oct. 17, 1988 now U.S. Pat. No. 4,989,896.

It is an object of the present invention to provide a method and apparatus for forming an air bag deployment opening in an interior trim panel in which there is no visible delineation of the opening prior to activation of the air bag.

It is a further object of the present invention to provide such method and apparatus which does not require a separate door closure assembly to be installed in the interior trim piece defining the opening, and which is simple and failsafe in operation.

SUMMARY OF THE INVENTION

These and other objects of the present invention which will become apparent upon a reading of the following specification and claims are achieved by a method and apparatus involving the application of a pattern of concentrated energy to the inside of a trim panel, just prior to inflation of the air bag device, the pattern delineated in the shape of a required deployment opening. Such energy may be generated and applied by the ignition of a segment of low power detonating cord, and almost instantaneously forms a door in the trim panel behind which the air bag is stored which may pushed open a split second later by the inflating air bag which is thereby able to be deployed through the resulting opening.

The door and trim piece may thus be of integral construction, without any exterior markings suggesting the presence of the air bag device, and offering superior aesthetics and lower costs over designs having separately assembled door panels.

Preferably, the reverse or inside face of the trim panel is formed with a groove delineating the door shape and which receives the energy applying element, i.e., the detonator cord segment.

Preferably, a rigid bridging piece reinforces the adjacent sections of trim panel on either side of the groove, and is formed with a fold closing off the groove space to direct the energy outward towards the joining segment of panel material, to more efficiently produce fracturing of the segment and formation of the door shape in the trim panel.

DESCRIPTION OF THE DRAWINGS

FIG. 4 is a fragmentary sectional view taken through the instrument panel structure in the embodiment of FIG. 2.

FIG. 5 is a fragmentary enlarged perspective view of the passenger side air bag installation shown in FIG. 3 showing additional details of the apparatus for forming a deployment opening.

FIG. 6 is an enlarged fragmentary sectional view taken through the instrument panel of the embodiment of FIG. 3 in the region whereat the deployment opening is to be formed.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
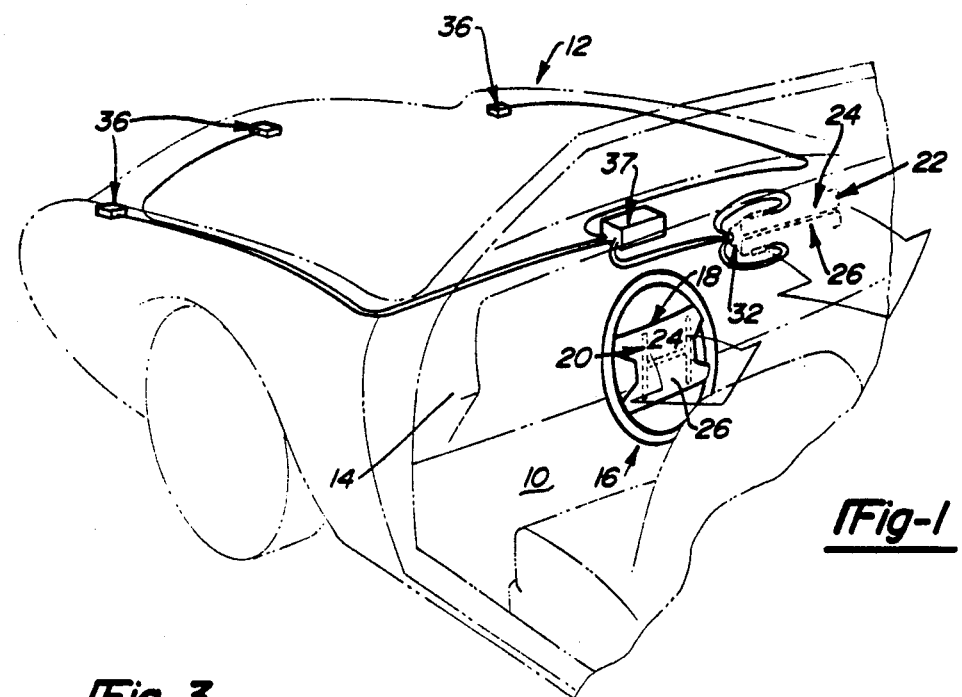
FIG. 1 is a fragmentary perspective view of the interior of an automotive passenger compartment having both a driver and passenger side air bag installation, with the location and shape of an air bag deployment door indicated therein.

Referring to the Drawings and particularly FIG. 1 the forward portion of the passenger compartment 10 of an automobile 12 is shown. Arrayed within the passenger compartment 10 are various interior trim panels including the instrument panel 14 extending across the front region thereof. The steering wheel 16 also has a trim cover 18 overlying its central hub area.

As discussed above, there has heretofore been developed inflatable air bag devices, located on each of the driver's side and passenger side, acting as cushions when deployed to safely absorb the momentum of the driver and passengers in the event of a crash.

Such devices comprise inflatable "bags" stored within the steering wheel 16 and behind the instrument panel 14 on the passenger side. At the moment of a crash, one or more sensors 36 detect the collision and cause activation of the air bag by causing the flow of an inflating gas into each bag, as by chemical generation of the gas, which causes the bag to be deployed within the passenger compartment 10 in time to absorb the momentum of the driver and passenger.

The air bag devices typically are assembled into cannisters 32 including a receptable holding the folded air bag and, the gas generator and ignition components, the cannisters mounted behind portions of the interior trim. Deployment openings are required to allow the air bags to enter the passenger compartment when inflated, which openings must be securely covered to prevent tampering until the air bag device is activated. Conventionally, this covering is provided by one or more doors located in the deployment opening which are opened by contact with the inflating air bag.

According to the concept of the present invention, separate doors are not provided, but rather concentrated energy is applied to an area of interior trim panel members behind which the air bag devices are mounted in a delineated pattern 20, 22 corresponding to the required location, shape and size of the required deployment openings.

The concentrated energy is applied just prior to inflation of the air bag itself, and is sufficient in magnitude to cause fracturing of the trim panel structure along the pattern to thereby form the doors, which can be pushed open by the pressure exerted by the bags themselves in being inflated.

The fracture pattern may be in an "H" shape when two hinged doors 24, 26 are desired as for rear facing openings. The H-patterns 20, 22 provide hinging sections between the legs of the upward and downward facing U's comprising the H-shape of the pattern.

In the case of a "top mounted" air bag, for the passenger side, a single door is usually employed, and in this case a U-shaped pattern 28 is employed (FIG. 3) to form the single door 30.

Figure 2:
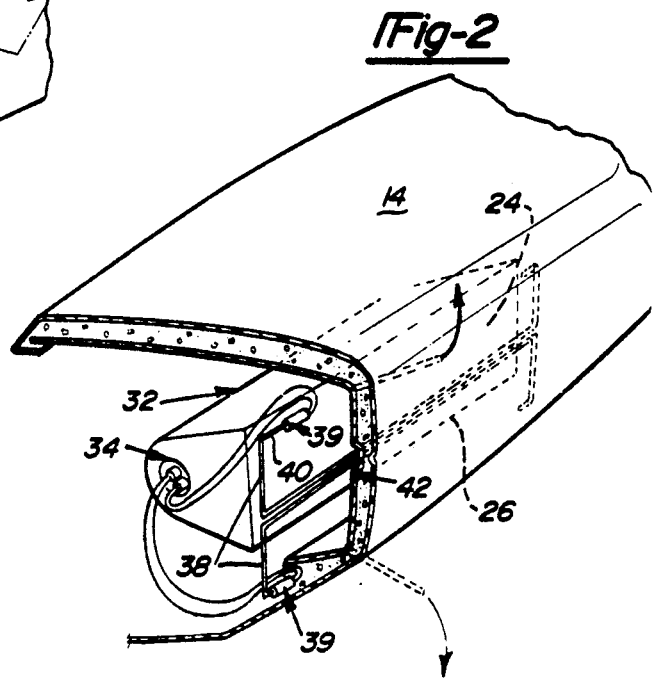
FIG. 2 is a fragmentary enlarged perspective view of the passenger side air bag installation shown in FIG. 1 showing additional details of the apparatus for forming a deployment opening.

The air bag cannister 32 is itself activated by a gas generator ignition device 34 (FIG. 2) itself first triggered by one of the sensors 36 detecting a collision event, with a control circuit 37 processing the sensor signals and causing an electrical activation signal to be transmitted to the air bag ignitor 34.

The detonating cord segments 38 are arranged in back-to-back generally U-shaped patterns, together forming the H-pattern. The legs of the U end in slightly inwardly curved sections 40 to prevent uncontrolled propagation of the fracture line with the unfractured trim panel material forming a door hinge extending between the U legs.

The detonating cord segments 38 are received into corresponding grooves 42 let into the inside face of the trim panel, here shown as the instrument panel 14.

The instrument panel 14 is conventionally constructed of an outer decorative skin 44 (FIG. 4), as of flexible vinyl, overlying a foam core 46, and a rigid backing piece 48, as of molded plastic. The grooves 42 are also formed in the backing piece 48 and partially into the panel core 46.

Figure 3:
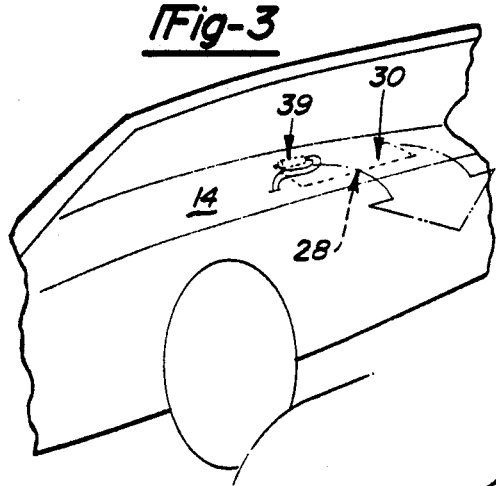
FIG. 3 is a perspective view of a portion of the passenger compartment shown in FIG. 1, depicting an alternate passenger side air bag installation.

As seen in FIGS. 5 and 6, in the embodiment of FIG. 3, a bridging reinforcing strip 50 extends about grooves 54, 56 in the panel core 46 and backing piece 48 respectively, the reinforcing strip 50 having one side fastened to the adjacent portions of the backing piece 48 and extending across the grooves 54, 56 to underlie the door section 26 which reinforce the same against inwardly pushing forces as applied by incidental passenger contact. The bridging strip 50 includes a fold 52 inserted into the grooves 54, 56 and extending outwardly to a point closely adjacent the primer cord segment 38. This has the effect of directing the energy of the detonation outwardly towards the connected portions of the core 46 and skin 44 to insure fracture thereof.

The detonating cord segments 38 may be ignited either by extending the cord segment 38 to the ignitor 34 of the air bag cannister 32 or may have a separate ignitor 39 as shown triggered by a wiring connection to the air bag ignitor so that ignition occurs at the same time the air bag is activated.

Primer cord is commercially available, comprised of a core of explosive such as PETN or RDX in a textile tube coated with a thin layer of asphalt. An outer textile cover is finished with a wax gum composition or plastic coating.

Such primer cord will transmit a detonating wave at a rate between 20,000 and 24,000 feet per second, and hence the energy generated will be applied in a fraction of a millisecond, before inflation of the air bag itself can occur.

This material is available in various charge densities, and minimum charge sizes will generate sufficient energy to fracture the trim panel material and form the deployment opening.

It should be appreciated that other means can be provided for applying concentrated energy in a delineated pattern, as by an electrical discharge, or a diversion of high pressure inflation gas through thin channels to be applied to fracture the trim panel in the required pattern.

We claim:

1. An auto air bag installation of the type including inflatable air bag means, including a folded air bag and means for inflating said air bag, both stored behind an interior trip panel defined within the passenger compartment of an auto vehicle, said air bag inflated to be deployed into said passenger compartment during a collision through an opening formed in said trim panel, said trim panel comprised of an outer decorative skin layer, a foam core laying beneath said decorative skin layer, and a rigid backing layer underlying said foam core and decorative skin layer, said installation characterized by said backing layer being formed with a groove extending in a U shaped pattern to define an air bag deployment opening door shape in said trim panel, a bridging strip extending under said groove on either side thereof, said bridging strip fastened to said backing layer on one side of said groove lying outside said pattern and underlying but unattached to the backing layer within said groove pattern to provide support beneath said backing layer, means for applying concentrated energy to the inside of said trim panel in a delineated pattern int he shape of the required opening just prior to inflation of the air bag, said means including an elongated energy applying element extending in said U-shape pattern above said bridging strip and within said foam core whereby upon activation of said elongated element said foam core and decorative skin are degraded in said U-shaped pattern so that said door formed by said groove pattern and degraded foam core and skin layer may be pushed open by the inflating air bag thereby providing a deployment opening in said trim panel.

2. The air bag installation according to claim 1 wherein said bridging strip is formed with a projection inserted into said groove.

3. The air bag installation according to claim 1 wherein free ends of said U pattern are curved towards each other.

* * * * *

UNITED STATES PATENT AND TRADEMARK OFFICE
CERTIFICATE OF CORRECTION

PATENT NO. : 5,080,393

DATED : January 14, 1992

INVENTOR(S) : David J. Bauer

It is certified that error appears in the above-identified patent and that said Letters Patent is hereby corrected as shown below:

On the title page, item (19), change Dixon, Jr., etal to --Bauer--.
Item (75) inventor should read --David J. Bauer--.

Signed and Sealed this

Fifteenth Day of June, 1993

Attest:

MICHAEL K. KIRK

Attesting Officer    Acting Commissioner of Patents and Trademarks